(12) United States Patent
McNichol

(10) Patent No.: US 6,227,046 B1
(45) Date of Patent: May 8, 2001

(54) SYSTEM FOR MEASURING CAPACITANCE

(75) Inventor: Randal S. McNichol, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/162,483

(22) Filed: Sep. 21, 1998

(51) Int. Cl.[7] .................................................. G01F 23/26
(52) U.S. Cl. ....................................... 73/304 C; 73/290 R
(58) Field of Search .............................. 73/304 C, 290 R; 324/664, 667, 668

(56) References Cited

U.S. PATENT DOCUMENTS

| | | | |
|---|---|---|---|
| 4,676,101 | * | 6/1987 | Baughman .......................... 73/304 C |
| 5,175,505 | * | 12/1992 | Magenau ............................. 73/304 C |
| 5,365,783 | * | 4/1993 | Zweifel ............................... 73/304 C |
| 5,546,005 | * | 8/1996 | Rauchwerger ...................... 73/304 C |
| 5,611,240 | * | 3/1997 | Yamaguchi ......................... 73/304 C |
| 5,907,242 | * | 5/1999 | Gaurd .................................. 324/326 |

* cited by examiner

*Primary Examiner*—Hezron Williams
*Assistant Examiner*—Katina Wilson
(74) *Attorney, Agent, or Firm*—James J. McGroary

(57) ABSTRACT

A system for detecting the level of a liquid in a tank wherein a capacitor positioned in the tank has spaced plates which are positioned such that the dielectric between the plates will be either air or the liquid, depending on the depth of the liquid in the tank. An oscillator supplies a sine wave current to the capacitor and a coaxial cable connects the capacitor to a measuring circuit outside the tank. If the cable is very long or the capacitance to be measured is low, the capacitance inherent in the coaxial cable will prevent an accurate reading. To avoid this problem, an inductor is connected across the cable to form with the capacitance of the cable a parallel resonant circuit. The impedance of the parallel resonant circuit is infinite, so that attenuation of the measurement signal by the stray cable capacitance is avoided.

3 Claims, 2 Drawing Sheets

SYSTEM FOR MEASURING CAPACITANCE

ORIGIN OF THE INVENTION

This invention was made by an employee of the United States Government and may be manufactured and used by or for the Government for governmental purposes without the payment of any royalties.

1. Field of the Invention

This invention relates to systems for measuring capacitances.

2. Background of the Invention

Frequently, it is important to know the level of liquids in a tank. Various methods have been proposed for determining liquid levels. It is known that a liquid level can be determined by positioning a capacitor inside the tank with either air or the liquid serving as a dielectric for the capacitor, depending on the level of the liquid in the tank. There must be a connection from the capacitor to a measuring circuit. Preferably, a coaxial cable is used to shield against any outside disturbance. However, the coaxial cable itself has some capacitance between its central conductor and the metallic shield. When the capacitance to be measured is very low and the coaxial cable is long, the inherent capacitance of the cable prevents an accurate measurement of the capacitance of the capacitor in the tank.

SUMMARY OF THE INVENTION

Figure 1:
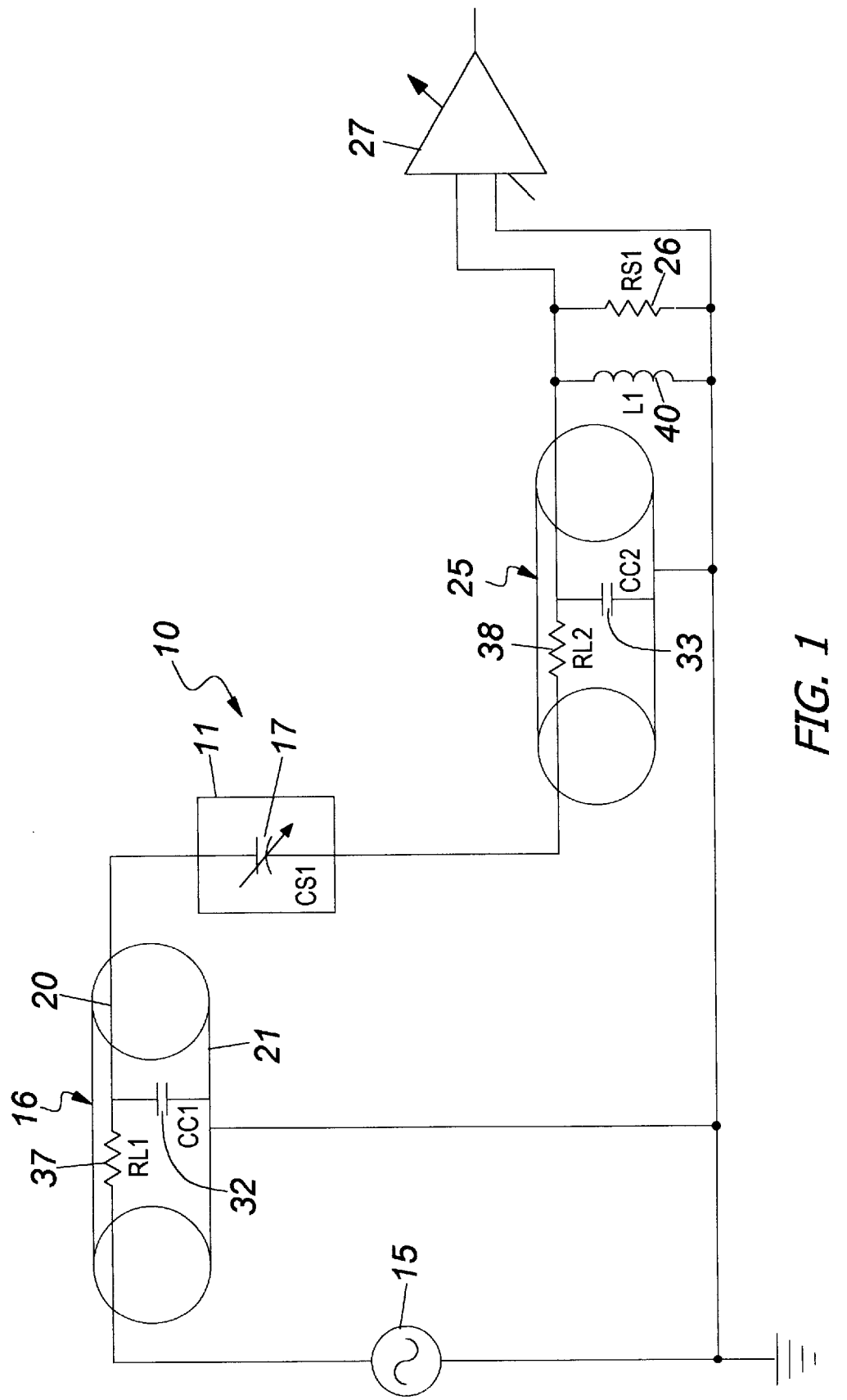
FIG. 1 is a schematic drawing of the circuit of this invention.
Figure 2:
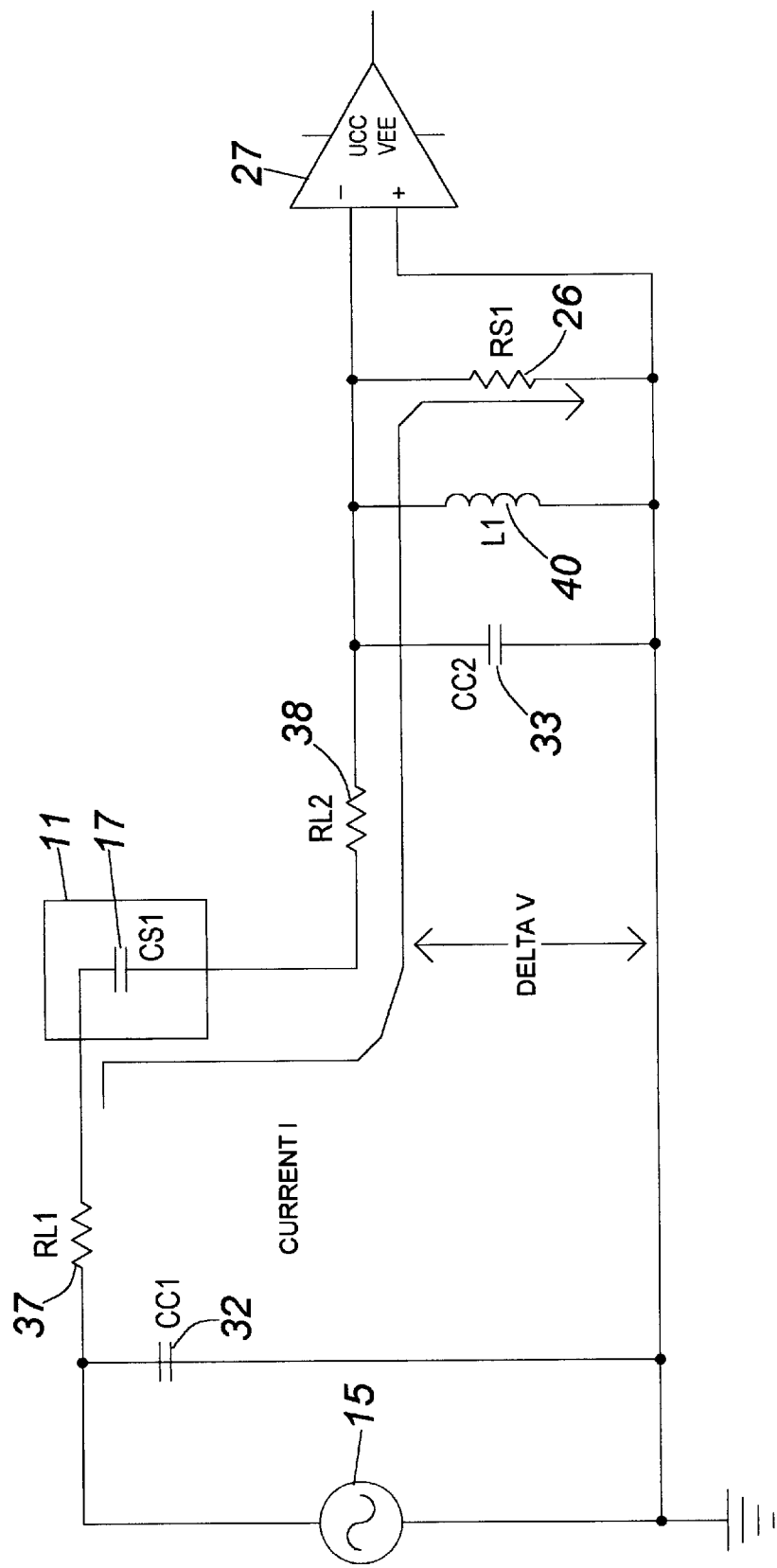
FIG. 2 is a block diagram of the circuit showing how the inherent cable capacitances would appear in a circuit diagram.

A system for detecting the level of a liquid in a tank wherein a capacitor positioned in the tank has spaced plates which are positioned such that the dielectric between the plates will be either air or the liquid, depending on the depth of the liquid in the tank. An oscillator supplies a sine wave current to the capacitor and a coaxial cable connects the capacitor to a measuring circuit outside the tank. If the cable is very long or the capacitance to be measured is low, the capacitance inherent in the coaxial cable will prevent an accurate reading. To avoid this problem, an inductor is connected across the cable to form with the capacitance of the cable a parallel resonant circuit. The impedance of the parallel resonant circuit is infinite, so that attenuation of the measurement signal by the stray cable capacitance is avoided.

DETAILED DESCRIPTION OF THE INVENTION

Referring now in detail to the drawings, there is shown, system 10 for detecting the level of a liquid in a tank 11. An oscillator 15 is connected by a first coaxial cable 16 to one side of a capacitor 17 positioned in the tank 11. The coaxial cable is provided with a central conductor 20 and a shielding conductor 21. Preferably, the oscillator output is 1 volt rms at 10 k hertz.

The capacitor 17 is of a type which will allow the medium to which it is exposed act as a dielectric for the capacitor. Thus, the dielectric will be either air or the liquid in the tank, depending on the depth of the liquid. The capacitor will have one impedance if the dielectric is air and another if the dielectric is the liquid. These different impedances will be used to determine whether the liquid level is up to or above the position of the capacitor in the tank.

The other side of the capacitor 17 is connected by a second coaxial cable 25 to one side of a sensing resistor 26. The resistor 26 is connected between the central conductor 20 of the cable and the shielding conductor 21. The purpose of the resistor 26 is to provide a voltage input to an amplifier 27.

From FIG. 1 it can be seen that the cables inherently have a capacitance between the central conductor 20 and the shielding conductor 21. The capacitance of the first cable 16 is identified by the reference numeral 32 and the capacitance of the second cable 25 is identified by reference numeral 33. Reference numerals 37 and 38 identify the resistance of the first and second cable but these resistances have no effect on the measured capacitance.

The capacitance 32 of the first cable 16 will have no effect on the signal from the capacitor 17, since they are connected in parallel across the oscillator 15 and have a constant 1 volt input.

With a length of 300 feet and a distributive capacitance of 30 picofarads per foot the capacitance 33, when excited by a 10 k hz AC signal and with a capacitance of 9 nanofarads, would give an impedance of only 1.77 k ohms. This impedance would short out the current flow across the resistor 26 and thereby greatly attenuate the signal from the capacitor 17.

To avoid this problem, an inductor 40 is connected across the cable 25 in parallel with the resistor 26 and the capacitance 33. The value of the inductance is selected to form, with the capacitance 33, a resonant parallel circuit. The impedance of this parallel resonant circuit is infinite, so that the capacitance 33 cannot attenuate the signal from the capacitor 17.

The voltage developed across the resistor 26 is fed through the amplifier 27 to a measuring circuit (not shown).

What is claimed is:

1. A system for detecting the level of a liquid in a container, comprising:
    a. a capacitor positioned in the container and having plates positioned to have either the liquid or air as a dielectric between said plates,
    b. an oscillator,
    c. a first coaxial cable connecting the oscillator to the capacitor and having a central conductor and a shield,
    d. a second coaxial cables connecting the capacitor to an amplifier and having a central conductor and a shield, said cable having an unwanted capacitance between said central conductor and said shield,
    e. a resistor connected between the central conductor and the shield of the second cable for providing a measurement voltage input, and
    f. an inductor connected between the central conductor and the shield of the second cable said inductor having an inductance sufficient to form with the unwanted capacitance of the second cable a resonant parallel circuit.

2. The system of claim 1 wherein the oscillator produces a sine wave.

3. The system of claim 2 wherein the resistor is connected to an amplifier for applying the measurement voltage to said amplifier.

* * * * *